United States Patent [19]
Carey et al.

[11] Patent Number: 6,070,152
[45] Date of Patent: May 30, 2000

[54] FRAMEWORK FOR BUSINESS APPLICATIONS PROVIDING FINANCIAL INTEGRATION

[75] Inventors: James Carey, Rochester, Minn.; Brent Carlson, Sollentuna; Tore Dahl, Hasselby, both of Sweden; Timothy Graser, Rochester, Minn.; Anders Nilsson, Hagan, Norway; Mark Pasch, Rochester, Minn.

[73] Assignee: International Business Machines Corporation, Armonk, N.Y.

[21] Appl. No.: 09/038,351

[22] Filed: Mar. 11, 1998

[30] Foreign Application Priority Data

Aug. 14, 1997 [EP] European Pat. Off. .............. 97114039

[51] Int. Cl.$^7$ ..................................................... G06F 17/60
[52] U.S. Cl. .................................. 705/35; 705/1; 707/103
[58] Field of Search ................................ 707/103; 705/9, 705/35, 8, 1

[56] References Cited

U.S. PATENT DOCUMENTS

| | | | |
|---|---|---|---|
| 5,634,124 | 5/1997 | Khoyi et al. .............................. | 707/103 |
| 5,826,239 | 10/1998 | Du et al. ...................................... | 705/8 |
| 5,864,862 | 1/1999 | Kriens et al. ............................. | 707/103 |
| 5,878,427 | 3/1999 | Wahead et al. .......................... | 707/103 |

OTHER PUBLICATIONS

Adair, Deborah, "Building Object-Oriented Frameworks", AIXpert, Feb. 1995.

Johnson, Raph E., "Frameworks Equal (Components +Patterns)", Communications of the ACM, Oct. 1997.

Quellette, Tim, "Middleware On Way For Object-Based Apps", Computerworld, Feb. 17, 1997.

Biggerstaff and Perlis, Software Reusability vol. II: Applications and Experience, Addison-Wesley (ACM Press), 1989.

Dave K. Kythe, "The Promise of Distributed Business Components", AT&T Technical Journal, vol. 75, No. 2, Apr. 1996, pp. 20–28.

*Primary Examiner*—Emanuel Todd Voeltz
*Assistant Examiner*—George D. Morgan
*Attorney, Agent, or Firm*—Owen J. Gamon

[57] ABSTRACT

The present invention relates to a method of developing a software system using Object Oriented Technology and frameworks for developing a business application. The present invention solves this problem with a framework framework comprising a using non-financial component integration base class, a target financial component integration base class, and a generic data conversion engine. The present invention is applicable in the technical field of application development of software systems, e.g. for a business application as Financial or Logistic and Distribution, wherein it is the purpose of frameworks to provide significant portions of the application that are common across multiple implementations of the application in a general manner, easy to extend for specific implementation.

10 Claims, 7 Drawing Sheets

GENERIC DISSECTION TYPE
STOCK ADJUSTMENT ─── 601

ANALYSIS GROUP 1-MAIN ACCOUNT ─── 609

ACT    AC    DESCRIPTION

FIXED ACC. USED 4550 STOCK ADJ.

─── 602
ANALYSIS GROUP 2-DEPARTMENT

ACT (WAREHOUSE)    AC    DESCRIPTION
              613
BB001 (BOEBL.)  BB    BOEBLINGEN
RC001 (ROCH.)   RCH   ROCHESTER
              ─── 611

─── 603
ANALYSIS GROUP 3-PRODUCT

ACT (PRODUCT)   AC    DESCRIPTION
           612
BFMB01         100   MOUNTAIN BIKE
BFRB01         200   RACING BIKE
BFTR01         300   TRIKE

GENERIC DISSECTION TYPE
STOCK VALUE ─── 608

ANALYSIS GROUP 1-MAIN ACCOUNT ─── 609

ACT              AC    DESCRIPTION
(COST TYPE; PRODUCT)        612
CNS01 (NORMAL)   STK VALUE
       BFMB01    1510  MOUNTAIN BIKE
  615  BFRB01    1511  RACING BIKE
       BFTR01    1512  TRIKE ─── 617
CDS01 (DAMAGED)
       BFMB01    1550  DAMAGED
  616  BFRB01    1550  DAMAGED
       BFTR01    1550  DAMAGED

─── 605
ANALYSIS GROUP 2-DEPARTMENT

ACT (WHS)       AC    DESCRIPTION
              613
BB001 (BOEBL.)  BB    BOEBLINGEN
RC001 (ROCH.)   RCH   ROCHESTER

─── 606
ANALYSIS GROUP 3-NOT USED

FIG. 6

| INPUT ACCOUNT CONTROL TYPE VALUES | | |
|---|---|---|
| COST TYPE | PRODUCT | WAREHOUSE |
| NORMAL | MOUNTAIN BIKE | ROCHESTER |
| CNS01 | BFMB01 | RCH001 |

RESULTING ANALYSIS CODES
STOCK ADJ. DISSECTION:
    AG 1=4550, AG2=RCH, AG3=100
STOCK VALUE DISSECTION:
    AG 1=1510, AG2=RCH

FIG. 7

FRAMEWORK FOR BUSINESS APPLICATIONS PROVIDING FINANCIAL INTEGRATION

The present application is related to the following commonly assigned co-pending applications filed on the same date as the present application, each of which is herein incorporated by reference:

U.S. Ser. No. 09/038,024 by Kathryn Bohrer et al., entitled "A Method of Developing a Software System Using Object Oriented Technology";

U.S. Ser. No. 09/038,352 by Brent Carlson et al., entitled "A Method of Using Decoupled Chain of Responsibility";

U.S. Ser. No. 09/038,349 by James Carey et al., entitled "Framework for Business Applications Using Cached Aggregate and Specification Key";

U.S. Ser. No. 09/038,025 by James Carey et al., entitled "Software Business Objects in a Multi-level Organizational Structure";

U.S. Ser. No. 09/081,114 by Brent Carlson et al., entitled "Method of Error Handling in a Framework"; and U.S. Ser. No. 09/038,381 by Anders Nilsson, entitled "A Method of Locating Software Objects in Different Containers".

FIELD OF THE INVENTION

The present invention relates to a method of developing a software system using Object Oriented Technology and frameworks for developing a business application.

DESCRIPTION OF THE RELATED ART

In order to maintain or enlarge their competitiveness, enterprises of almost every type of business all over the world have to rework and bring up to date their information technology to meet customer's requirements and thus to be successful in the market. But keeping an information system based on traditionally developed software up to date is at least an expensive undertaking, and in many cases it is an unsolvable problem Object Oriented Technology or simply Object Technology, often abbreviated "OOT" or simply "OT", has the technical potential to overcome the problems associated with development, maintenance, and extension of software applications within a company's information system and to provide interoperability and adaptability across multiple applications and hardware platforms.

Object Oriented Technology describes a method for the development of operating software as well as application software for a computer system. Contrary to the traditional, non object oriented ways of developing software, Object Oriented irs Technology comprises and uses preengineered "methods" and "objects" for the development of software, comparable to tools and parts for the development of an automobile.

Similar to the development of an automobile, wherein not each required screw is developed individually, but standardized screws are used which can be individually adapted by shortening to the required length, within the development of software, Object Oriented Technology provides a "class" as a kind of software template from which individual "objects" can be instantiated. These classes are usually stored in a software library or a so called "class library". A class library is simply a collection of several classes stored together in a special filing format called a library.

In Object Oriented Technology an "object" is a self-contained piece of software consisting of related data and procedures. Data means information or space in a computer program where information can be stored, e.g. a name or an inventory part number. Procedures are parts of a program that cause the computer to actually do something, e.g. the parts of a program which perform calculations or the part of a program that stores something on a computer disk. In Object Oriented Technology, an object's procedures are called "methods".

The concept of an object being a self-contained piece of software having data and procedures inside itself is a new way of developing software. In non object oriented software, most of the data for an entire program is often grouped together near the beginning of the program, and the procedures then follow this common pool of data. This conventional method worked okay for smaller programs, but as soon as a piece of software started to grow and become somewhat complex, it become increasingly difficult to figure out which procedures were using which data. This made it quite difficult and expensive to debug or change traditional software programs.

In Object Oriented Technology it is generally easier to debug, maintain, and enhance object oriented software. The most popular object oriented programing languages are probably "C++", "JAVA", and "Smalltalk". The concept that both data and methods are contained inside an object is called "encapsulation". Part of the concept of encapsulation is that an object has a predictable way of communicating with other objects, a so called predictable "interface" or sometimes also called the method contract.

Provided that interface will not be changed, the code or methods inside the object can be changed without disrupting other objects' ability to interact with that object For example, a TAX CALCULATION object would have a predictable interface for use by PAYCHECK objects. Provided that interface will not be changed, the detailed program code inside the TAX CALCULATION object could be changed whenever the tax laws changed, and no other objects in the payroll system would have to know anything about such changes.

In Object Oriented Technology the term "inheritance" is used to communicate the concept that one object can inherit part of its behavior and data from another object, e.g. since an employee is a type of person, an EMPLOYEE object might inherit the characteristics of a PERSON object, such as having name, birth date, and address data, as well as an EMPLOYEE object might inherit methods for updating and displaying these data.

Even if an object inherits some of its characteristics from other objects, that object can, and usually would, also have its own non-inherited characteristics, e.g. whereas a PERSON object would have an inheritable method to display a person's address, a PERSON object would probably not have a method for displaying paycheck history, since not all persons get paychecks. Because an EMPLOYEE object could not inherit this method from a PERSON object, an EMPLOYEE object would have to define its own method for displaying paycheck history.

Although Object Oriented Technology clearly seems to be the most sophisticated way for the development, mainentance, and extension of software applications, many companies developing software applications are concerned about the cost and risks involved with the rework of existing applications and with the construction of new applications using Object Oriented Technology. For those software application developers, a technical foundation for software applications has to be built as a tool using Object Oriented Technology as the basis, allowing each developer to develop highly unique software products. This technical foundation is formed by frameworks comprising the basic application structure which software application developers previously had to develop by themselves.

In Object Oriented Technology the term "framework" is used to describe a reusable set or collection of classes which work together to provide a commonly needed piece of functionality not provided by any of the individual classes inside the framework. Thus a framework defines a specific way in which multiple objects can be used together to perform one or more tasks which no single object performs. In other words, a framework is a reusable, predefined and preengineered bundle of several objects which address a recurring programming problem.

Frameworks provide a way of capturing a reusable relationship between objects, so that those objects do not have to be reassembled in that same relationship every time they are needed. Frameworks provide a way of grouping multiple objects together to perform some function which should not have to be thought through each time at the underlying object level. For example, a PRINT framework would consist of all the objects necessary for a programmer to easily print something on any printer, and would probably include objects for printer selection, spooling to disk or error detection as "out of paper". Frameworks can be regarded as a group of software objects which contain a technical foundation for a software application. For example in the business field of Financial, Logistic and Distribution or Production. Although a framework represents a skeleton of a software application, usually a framework is not an executable software program.

E. GAMMA et al: "Design Patterns: elements of reusable object-oriented software", Addison-Wesley, 1995, ISBN 0-201-63361-2, gives a useful introduction to Object Oriented Technology in general and to design pattern more specifically, in particular with regard to the present invention.

By providing frameworks as the technical foundation for developing software applications, the following problems have to be addressed:

Applications have to support all hardware platforms and related software operating systems relevant on the market. Applications have to fulfill the requirements related to client/server configurations including the requirement for graphical user interfaces and windowing techniques. Also, applications have to offer internet compatibility and access on demand. Furthermore applications have to provide integrated solutions with respect to installed software.

In particular, the core of most business applications is the General Ledger. One of the more difficult problems that must be solved by a business application is how to enable multiple diverse business application components, e.g., payroll/personnel, warehouse management, manufacturing, in many cases developed by different development organizations, to provide input to the General Ledger in a manner which is tailored to each component's specific requirements. This task must be accomplished while at the same time enabling multiple General Ledger components, again developed by different development organizations, to interoperate with the framework. The framework must also support applications that choose not to provide a General Ledger component without requiring the remaining application components to be modified in any way.

In addition, frameworks must be capable of supporting flexible representations of a set of non-uniform items.

Within the accompanying figures, representation standards for classes, objects, relationships etc. are used at least partly according to Grady Booch: "Object-Oriented Analysis and Design with Applications", second edition, The Benjamin/Cummings Publishing Company, Ind., Redwood City, Calif., USA.

SUMMARY OF THE INVENTION

It is an object of the present invention to provide a technical foundation for the development of software applications using Object Oriented Technology which overcomes the above discussed problems.

It is a further object of the present invention to enable multiple diverse business application components to provide input to the General Ledger component in a manner which is tailored to each component's specific requirements.

The present invention solves this object with methods and apparatus as laid down in enclosed independent claims. Particular embodiments of the present invention are presented in the respective dependent claims.

In particular, the present invention provides a framework to be used for developing a software system, e.g. for a business application, said framework is a financial integration framework characterized in that said financial integration framework is composed of three major components: Using non-financial component integration base classes, target financial or General Ledger component integration base classes, and a generic data conversion engine.

This invention is easily customizable to any specific business application component Furthermore, it enables cross-component data mapping at any level of complexity desired by the development organization, providing a generic data conversion engine whose mechanism is fully functional without development organization modification. This engine accepts the diverse data provided by the other components of the framework in the form of domain-specific class instances, such as Product, Warehouse, Customer, and Stock Type for a warehouse management component and converts that data into a form compatible with the General Ledger framework interface, i.e. Generic Dissections containing Generic Posting Combinations made up of one or more instances of Generic Analysis Codes, each of which is associated with a separate Generic Analysis Group. It operates independently of any General Ledger application component at a basic level, while enabling any General Ledger application component developed for the framework to easily replace the basic level function with its own more sophisticated function.

DETAILED DESCRIPTION

Figure 1:
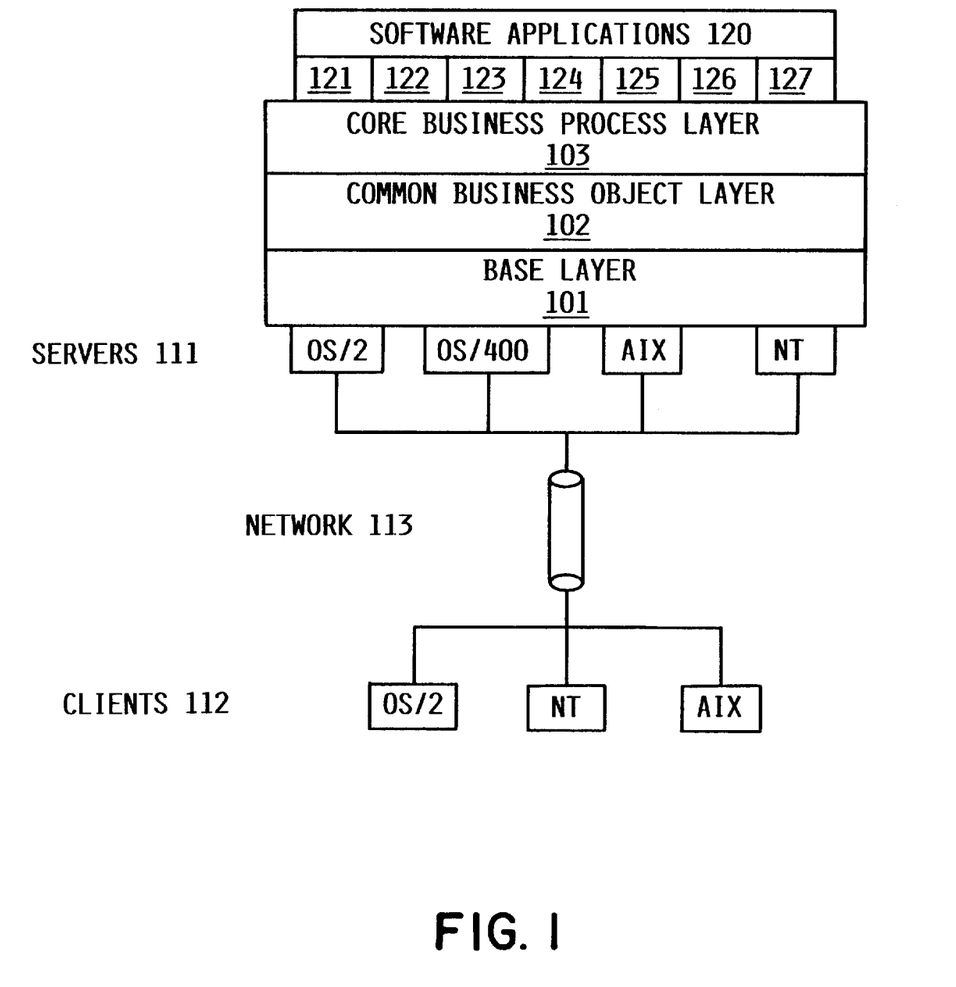
FIG. 1 shows a four layer schema from which software application can be developed using the present invention.

Developing software applications using the subject of the present invention as a development tool can be regarded as built up of four layers as shown in FIG. 1.

The lowest layer is the base layer 101. The base layer 101 provides and manages the interface with the server hardware 111 which is potentially running under different operation systems such as OS/2, OS/400, AIX, and NT. The server hardware 111 is connected with client hardware 112 via a communication network 113. The client hardware 112 may also potentially running under different operation systems such as OS/2, NT, and AIX. The embodiment shown in FIG. 1 shows the development of the server portion of a client/server application only.

The Base layer 101 represents the technical foundation for the higher level objects including many functions near to an operating system such as finding objects, keeping track of their names, controlling access to them, resolving conflicts, security administration, and installation. The Base layer 101 also includes the so called Object Model Classes which provide a consistent model for building objects while hiding the complexity of the underlying infrastructure form the software application developer. The Base layer 101 can be regarded as a kind of lower middleware necessary for the application of the Object Technology above it using the interface functionality provided by the Base layer 101.

Above the Base layer 101 there is a layer comprising Common Business Objects 102. This Common Business Object layer 102 provides a large number of objects which perform functions commonly needed within a business application, e.g. date and time, currency, address, units of measure, and calendar. These Common Business Objects represent the building blocks from which software application developers can select and create business applications, e.g. these Common Business Objects can be copied and extended to perform new functions as for example the date and time object can be extended to handle the Chinese calendar.

The layer 103 above the Common Business Objects layer 102 already comprises Core Business Processes and can be regarded as the Core Business Process layer 103. Although layer 103 usually does not provide executable code, within this layer 103 the business software applications developed using the present invention begin to take shape. Each Core Business Process layer is built for one specific type of application, as for example General Ledger or Warehouse Management.

This Core Business Process layer 103 can be regarded as an upper middleware which—although not a complete software application program—already contains the basic functions which all of the application programs of this type require. It is the Core Business Process layer 103 which creates the application frameworks, wherein some of the Common Business Objects are linked to a large number of objects specific to the type of framework being built, e.g. Warehouse Management. The resulting framework is constructed in a way to contain commonly used functions as well as to be easy to extend.

On top of the above described three layer model the application software is located, created by the software application developer and representing executable code. It is the choice of a software application developer whether to use only the base layer 101, the base layer 101 and the Common Business Object layer 102, or all three layers 101, 102, and 103 for the development of his software application. In every case he has to develop a remaining part of the application by himself and therefore every resulting software application program will be a completely unique product.

It has to be noted that the subject of the present invention is represented within the three layer model 101, 102, and 103 and is not represented by the executable code of the software application 121 developed using the present invention.

Figure 2:
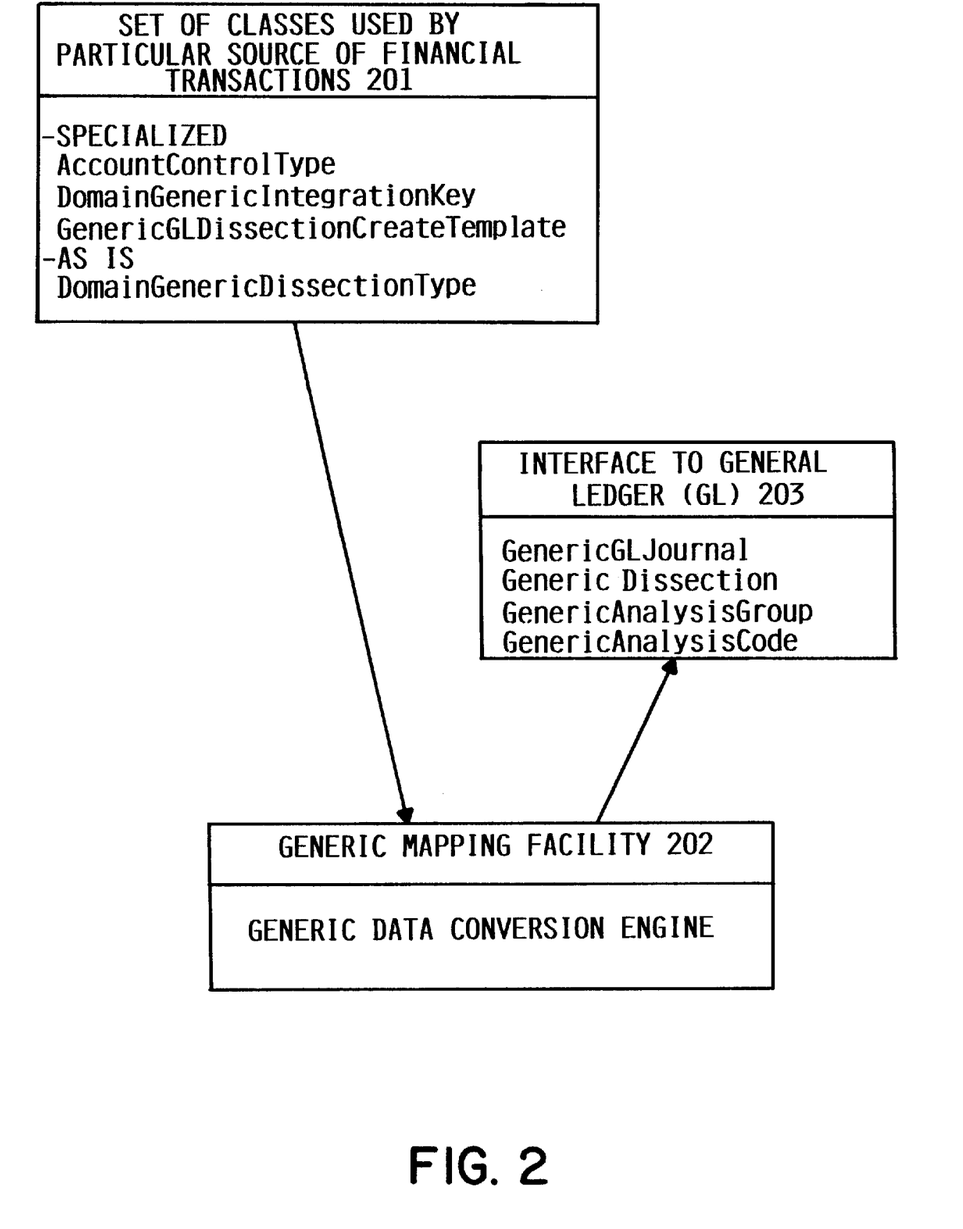
FIG. 2 shows the three main sections comprised by the financial integration framework.

As shown in FIG. 2, the financial integration framework comprises of three main sections 201, 202, and 203. The first section 201 is a set of base classes which are used by the particular source of financial transactions. The second section 202 is a generic data conversion engine which uses the specializations in the first section 201 as their abstract base classes to map from the particular source's particular items of interest to associated items in the interface of the General Ledger. The third section 203 consists of the interface to the General Ledger (GL) which allows information to be generically passed to the General Ledger and hide the particular implementation or if it is even preset.

A business application component that wishes to use the financial integration framework must first define a set of concrete classes which are subclassed from base classes provided by the framework. The function of these concrete classes is primarily derived from the framework base classes. The domain-specific concrete classes provide additional isolation between the business application component and the framework and allow the component developer to define a domain-specific interface that is meaningful to the remainder of the component. This greatly improves ease of use of the framework during application development.

In an embodiment of the invention, the following base classes defined by the framework must be subclassed by the business application component developer:
AccountControlType:

The AccountControlType base class allows the framework to use any domain-specific class in the generic data conversion engine. The application component developer must define a subclass of this class for each domain-specific class to be used by the engine. An instance of each of the component-defined subclasses is then given to the generic data conversion engine. The engine maintains the order of this set and uses it during the generic mapping process.
DomainGenericIntegrationKey:

The application component developer creates a single subclass of the DomainGenericIntegrationKey base class. This subclass converts the generic Integration Key interface into one which conforms to domain-specific terminology, e.g., setProduct, setWarehouse. Each domain-specific interface on the subclass is coupled to one or more domain-specific AccountControlType subclasses. The AccountControlType subclass serves as an index when building the GenericKey used by the generic mapping process.
GenericGLDissectionCreateTemplate:

Subclasses of the GenericGLDissectionCreateTemplate class are used to encapsulate all the information needed by the financial integration framework to create a GenericDissection. Each template subclass is associated with a DomainGenericDissectionType instance, which is used by the generic data conversion engine to select the proper mapping subset when processing the template. Each template subclass allows the application component developer to pass all the necessary domain-specific information that is required for the dissection when an instance of the subclass is instantiated. The subclass then packages this information into a form which is compatible with the generic data conversion engine. Part of this processing includes building an Integration Key using the domain-specific subclass described earlier.

The business application component must also create one or more instances of the DomainGenericDissectionType class, associating each instance with one or more AccountControlType subclasses. This association defines the domain-specific classes that are of interest of a particular dissection type. One instance of the DomainGenericDissectionType class is created for each GenericGLDissectionCreateTemplate subclass defined by the business application component.

The financial integration framework further includes a set of base classes which support the interfaces used by the generic data conversion engine. This allows the financial integration framework to operate in the absence of a General Ledger application component. The base classes provided by the framework include:

GenericGLJournal

This class represents a set of dissections which are to be posted concurrently to the General Ledger (GL). Typically for a journal to be posted successfully, the sum of its debit dissections must equal the sum of its credit dissections.

GenericDissection

This class represents a specific financial entry (either debit or credit) which is to be posted to the General ledger as part of a journal. It contains a GenericPostingCombination along with quantity and value information.

GenericPostingCombination

This class identifies the General Ledger account that a dissection is to be posted to. It is composed of one or more GenericAnalysisCodes.

GenericAnalysisGroup

This class represents a group of similar business entities, e.g., department, job function, cost center, which are of interest to the user of a General ledger application. Each instance of a group is represented by a GenericAnalysisCode.

GenericAnalysisCode

This class represents a specific business entity within a GenericAnalysisGroup. Instances of this class are defined by the user. During setup of the finanacial integration framework, the user associates a GenericAnalysisCode instance with a set of domain-specific object instances. These domain-specific object instances are selected from the AccountControlTypes specified by the user as meaningful for the combination of DomainGenericDissectionType and GenericAnalysisGroup. These mapping pairs form the core of the information which is used by the financial integration framework to process financial transactions.

While the financial integration framework operates in the absence of a General Ledger application component, such a component must be provided by the application in order for any meaningful financial processing to be completed. A General Ledger component is easily integrated into the framework by simply configuring the framework's object factory to replace the generic versions of the classes listed above with replacement classes provided by the General Ledger component. Other components using the financial integration framework—and indeed, the framework itself—are not aware of this class replacement, as all the function needed to complete their portion of the financial integration task is defined at the generic base class level.

Legacy non-object-oriented General Ledger applications can be easily integrated into this framework in the same way. The subclasses used for such integration are defined to map between the generic object-oriented framework interfaces and the procedural interfaces provided by the legacy application.

The generic data conversion engine defined by this invention provides, at its core, a generic mapping process which is capable of mapping between instances of domain-specific classes defined by the using components of the framework and instances of the General Ledger specific base classes defined by the framework. This mapping mechanism provides separate instances for each using component, so that each component has the freedom to independently define its mapping rules without danger of interference from the other components of the application, allows any number of Dissection types to be defined generically by the using component, each of which can be associated with any number of domain-specific classes to be used by the mapping engine, and allows the application user to selectively enable the use of any or all of the domain-specific classes defined by the using component by coupling those classes to Generic Analysis Group class instances previously defined by the user and associating specific combinations of domain-specific class instances to Generic Analysis Code class instances defined by the user for each Generic Analysis Group.

The engine also provides a generic journal building process which bundles the generic transactions supplied by the application component into a consolidated form compatible with the General Ledger application component associated with the financial integration framework.

The generic mapping process must be capable of working with domain-specific classes without explicit knowledge of their type or contents. Such knowledge must be avoided because otherwise the framework would be unacceptably coupled to a specific domain implementation and extension of the framework to new domain areas would become cumbersome.

This is a primary problem of the framework, which this invention provides a solution for. An AccessKey/Keyables mechanism defined by fiameworks of the present invention allows the financial integration framework to work with any domain-specific class generically (For AccessKey see related patent application "Access Key Objects", filed with the European Patent Office, Application No. 97100566.6, filing date Jan. 16, 1997). Each domain-specific class of interest to an application component is assigned an ID, held generically as a subclass of the framework class AccountControlType, known to the financial integration framework and a position within the Generic Key used by the mapping engine. When a domain defined Dissection is processed by the framework, each domain-specific class instance is wrapped by a Generic Keyable and placed into the zov previously specified position within the Generic Key. This key can then be used during the mapping process for the Dissection. Once contained in this manner, the domain-specific mapping data can be manipulated generically during the search for the user-specified set of Analysis Codes that will make up the Posting Combination for this Dissection.

Each dissection type defined by a using application component specifies the set of domain-specific Attributes via a list of AccountControlType subclass instances which can be used by the generic mapping process. During application configuration, the user of the application must indicate which of the available Attribute types will be used in the mapping process and the specific mappings which are valid for this installation.

Figure 3:
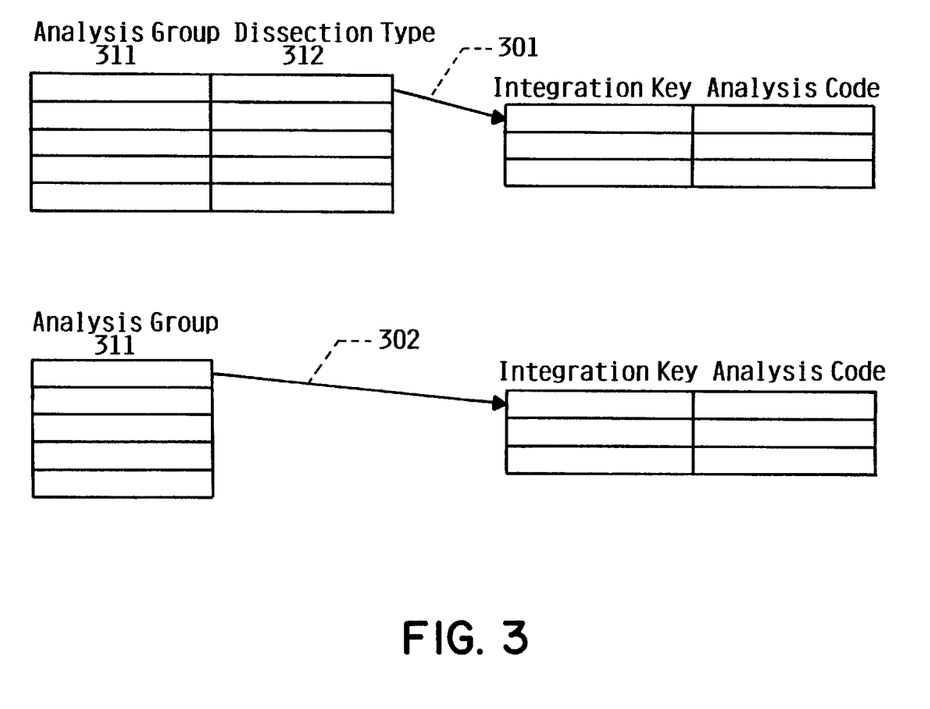
FIG. 3 shows specialized and default mappings.

As shown in FIG. 3, mappings may be defined for a dissection type 312 and AnalysisGroup 311, i.e. a specialized mapping 301, or solely for an AnalysisGroup 311, i.e. a default mapping 302 which applies to all dissection types in the absence of a successful comparison to a dissection type/AnalysisGroup-specific mapping. Each of the specific mappings specified by the user are encapsulated into AccessKeys, just as the input from the domain-specific dissections will be during normal operation of the application. Thus, once the framework is configured in this way, the conversion process is automatic and can be carried out generically within the framework by comparing GenericKey instances.

Figure 4:
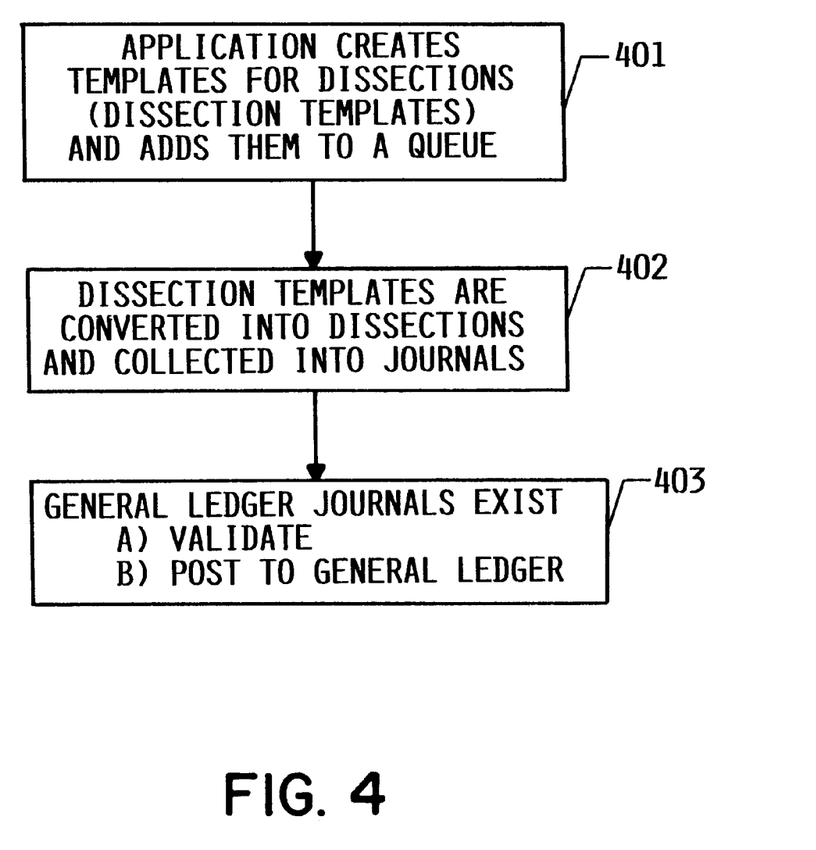
FIG. 4 shows the generic journal building process.

As shown in FIG. 4, the generic mapping process is part of the generic journal building process supported by the conversion engine. Neither the mapping nor the conversion process is completed at the time the domain-specific application component creates a dissection template instance 401. Instead, these instances are collected and held by the financial integration framework until the application initiates the generic journal building process 402. The first step of this process involves selecting a subset of dissection templates based on a configurable policy, for example based on a specific JournalCreationId provided by the application component when it created the dissection template. Each template in the set is then processed, first by completing the generic mapping which results in the creation of a GenericPostingCombination, followed by building a GenericDissection from the GenericPostingCombination and the remaining information held by the template. Once the GenericDissection is built, it can be inserted into the GenericJournal 403 created for this subset of dissection templates. After all the dissection templates have been processed in this way, the GenericJournal is posted and financial integration processing is complete.

Figure 5:
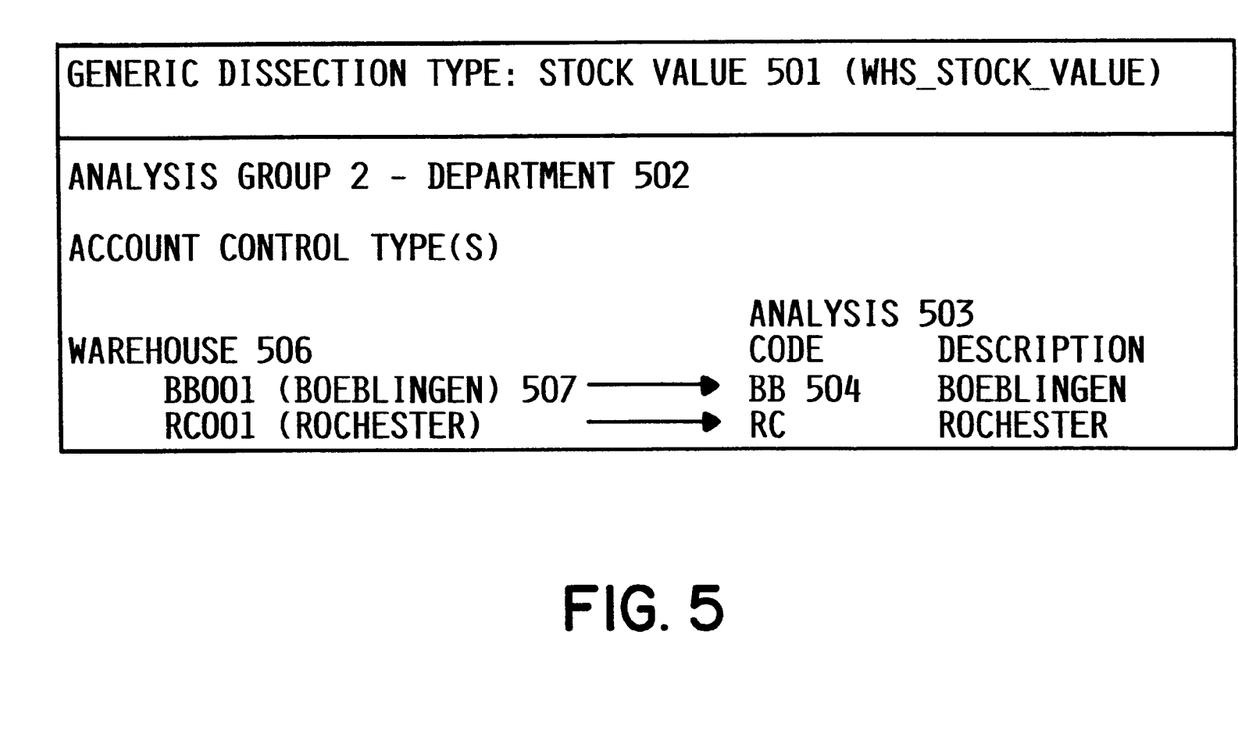
FIG. 5 shows an example of mapping for one Analysis Group for a particular Generic Dissection Type.

FIG. 5 shows an example of mapping for one Analysis Group for a particular Generic Dissection Type. In this case the Generic Dissection Type is STOCK VALUE 501, which is used to indicate to the financial portion of the application a change in the value of the stock on hand. The target financial application represents its accounts in pieces. Each piece is called an Analysis Group and represents some aspect of interest to the user. A typical Analysis Group would be Department 502. Within an Analysis Group the specific values are called Analysis Codes 503. For example the Analysis Group Department might contain Analysis Codes like SALES, ENGINEERING, etc. Thus, an account is made up of a set of Analysis Codes each for an Analysis Group.

In this particular example only Analysis Group 2—Department 502 is shown. For Analysis Group 2 only the Account Control type for Warehouse 506 is used. FIG. 5 shows that warehouse "BB001" 507 maps to Analysis Code "BB" 504. Thus, when using the Stock type Generic Dissection type, given "BB001" for the warehouse Account Control type will result in the "BB" Analysis Code being used for Analysis Group 2.

Figure 6:
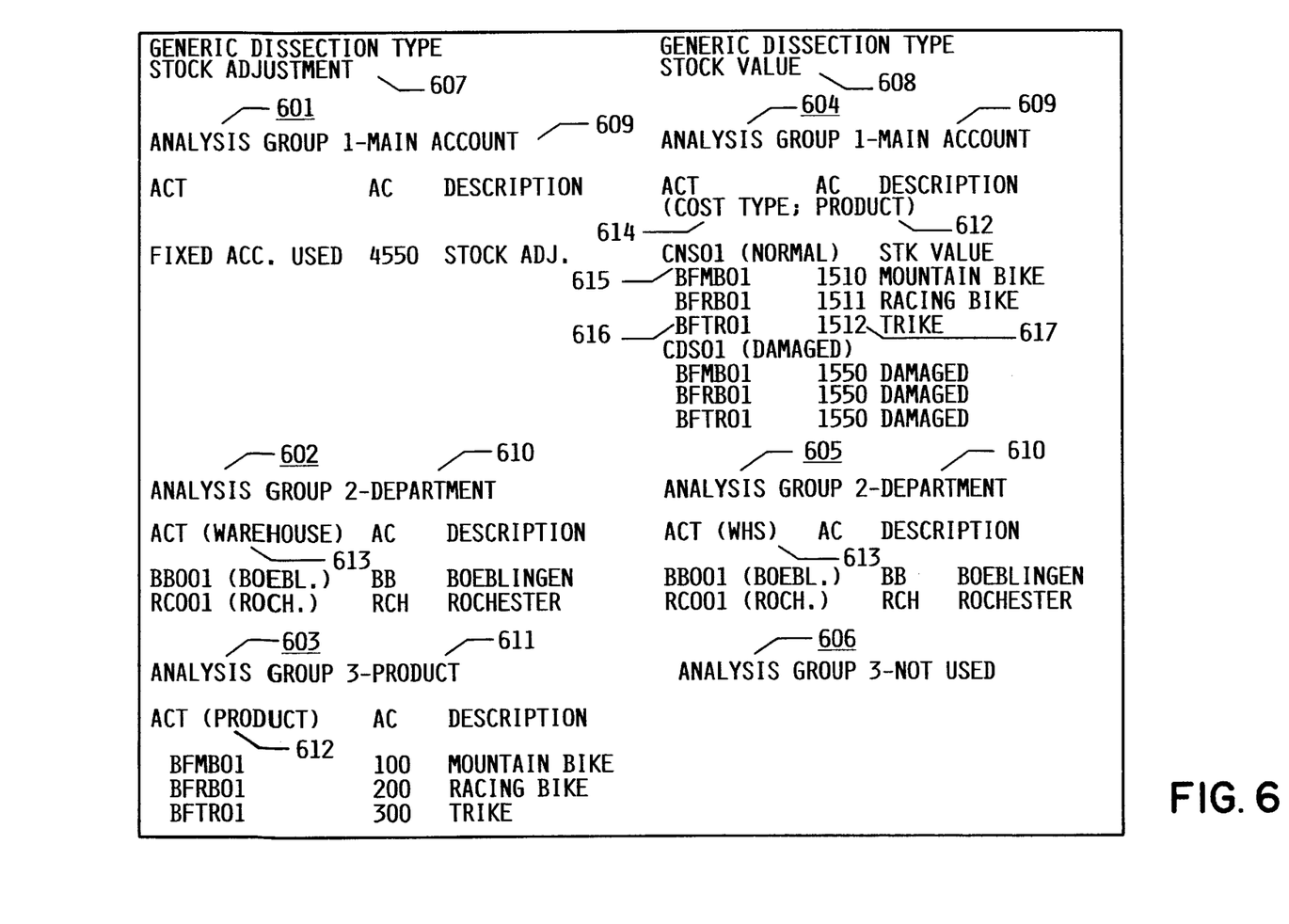
FIG. 6 shows a more complex example with two Generic Dissection types, three Analysis Groups, and three Account Control types.

FIG. 6 shows a more complex example with two Generic Dissection types (Stock Adjustment 607 and Stock Value 608), three Analysis Groups (1=Main Account 609, 2=Department 610, and 3=Product 611), and three Account Control types (Product 612, Warehouse 613, and Cost Type 614). Map 601 shows a special case where a particular Analysis Code should be used for the Analysis Group no matter what Account Control type is used. In this particular case, Analysis Code "4550" will always be used. Maps 602, 603, and 605 are similar to FIG. 5 described above. Map 606 is used to show that all possible Analysis Groups do not have to be used and in 606 no Analysis Code is desirable for Analysis Group 3 (not used) for this particular Generic Dissection type. Map 604 shows a case where more than one Account Control type is used. In this particular case Cost Type 614 and Product 612 are used. Thus for a cost type of "CNS01"(normal) 615 and a product of "BFTR01"(trike) 616 the Analysis Code "1512" 617 would be used.

Figure 7:
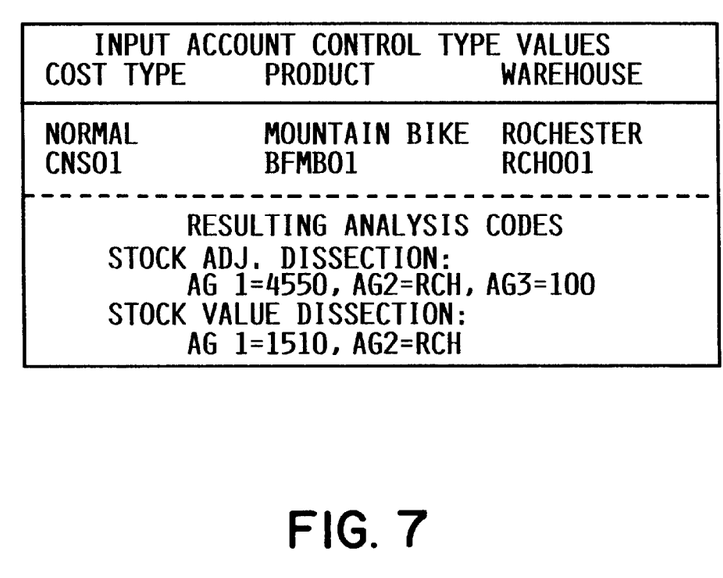
FIG. 7 shows an example of using the maps defined in FIG. 6.

FIG. 7 shows an example of using the maps defined in FIG. 6. In this example the specified Account Control type values are used for each of the Generic Dissection types to determine the appropriate Analysis Codes to build the Account for giving the information to the financial application.

We claim:

1. A financial integration framework for developing a business application in a software system, wherein the framework is stored on a server, wherein the framework comprises:

a set of base classes comprising domain-specific classes that can be instantiated;

an interface to a General Ledger, wherein the General Ledger interface comprises Generic Dissections comprising Generic Posting Combinations comprised of at least one instance of Generic Analysis Codes; and a generic data conversion engine that maps domain-specific class instances to the General Ledger interface, wherein when the generic data conversion engine processes each domain-specific class instance, the generic data conversion engine wraps the domain-specific class instance by a Generic Keyable and places the result in a Generic Key.

2. The framework of claim 1, wherein the base classes further comprise Product, Warehouse, Customer, and Stock Type classes.

3. The framework of claim 1, wherein the base classes further comprise Account Control Type and Domain Generic Integration Key classes.

4. The framework of claim 1, wherein the base classes further comprise Generic Journal, Generic Dissection, Generic Posting Combination, Generic Analysis Group, and Generic Analysis Code classes.

5. The framework of claim 1, wherein the Generic Analysis Codes are each associated with a separate Generic Analysis Group.

6. An apparatus for developing a business application in a software system, comprising:

a server; and a financial integration framework stored on the server, wherein the framework comprises:

a set of base classes comprising domain-specific classes that can be instantiated, an interface to a General Ledger, wherein the General Ledger interface comprises Generic Dissections comprising Generic Posting Combinations comprised of at least one instance of Generic Analysis Codes, and a generic data conversion engine that maps domain-specific class instances to the General Ledger interface, wherein when the generic data conversion engine processes each domain-specific class instance, the generic data conversion engine wraps the domain-specific class instance by a Generic Keyable and places the result in a Generic Key.

7. The apparatus of claim 6, wherein the base classes further comprise Product, Warehouse, Customer, and Stock Type classes.

8. The apparatus of claim 6, wherein the base classes further comprise Account Control Type and Domain Generic Integration Key classes.

9. The apparatus of claim 6, wherein the base classes further comprise Generic Journal, Generic Dissection, Generic Posting Combination, Generic Analysis Group, and Generic Analysis Code classes.

10. The apparatus of claim 6, wherein the Generic Analysis Codes are each associated with a separate Generic Analysis Group.

* * * * *